July 23, 1929.　　　C. M. ANGELL　　　1,721,681
BATTERY CHARGER APPARATUS
Filed July 17, 1926
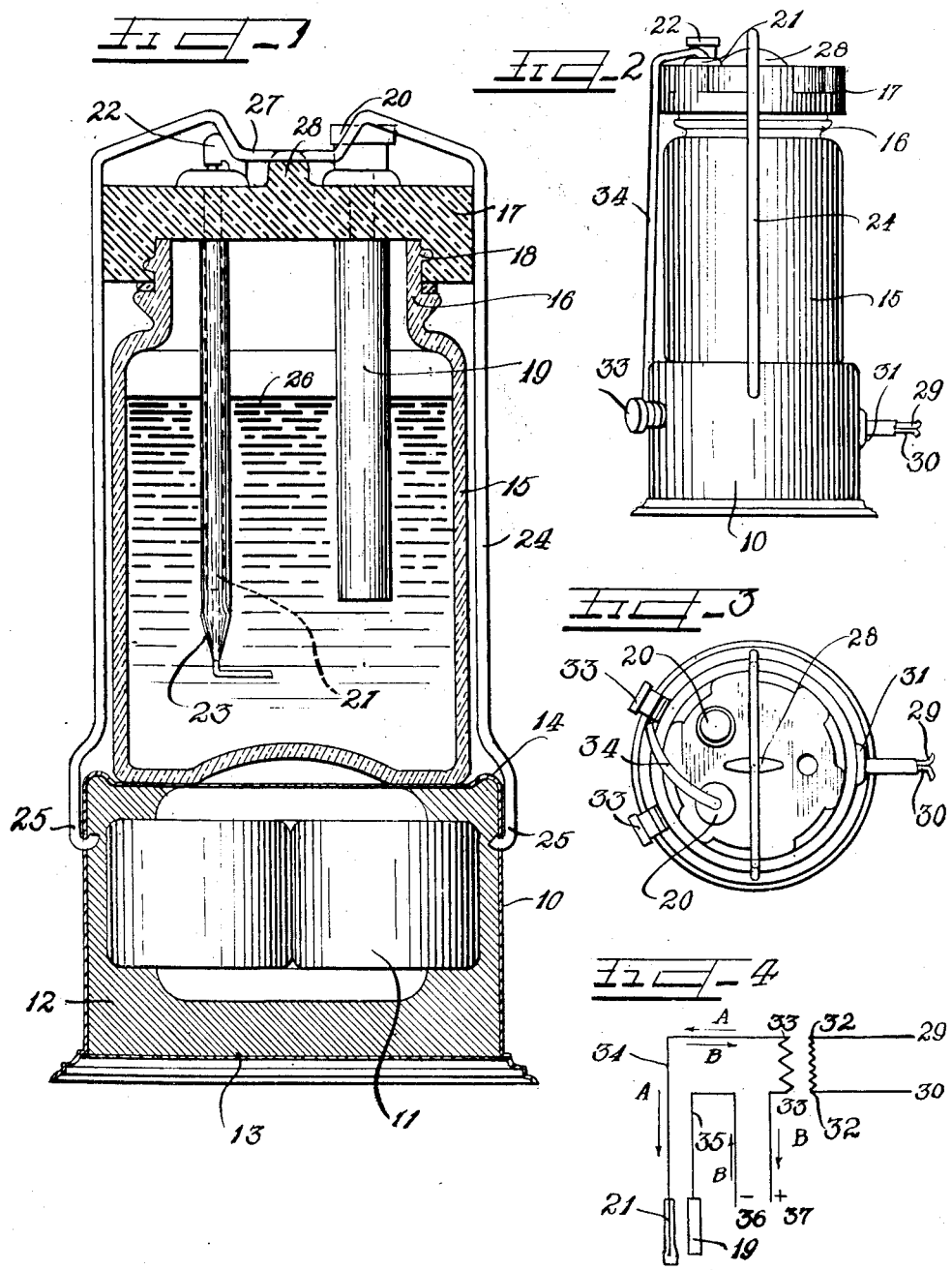
Inventor
Chester M. Angell
By Charles W. Hills
Attys Patented July 23, 1929.

1,721,681

UNITED STATES PATENT OFFICE.

CHESTER M. ANGELL, OF CHICAGO, ILLINOIS, ASSIGNOR TO VESTA BATTERY CORPORATION, A CORPORATION OF ILLINOIS.

BATTERY-CHARGER APPARATUS.

Application filed July 17, 1926. Serial No. 123,142.

This invention relates to battery chargers commonly known as trickle chargers.

The requisite features of a battery charger are compactness, portability, simplicity, and inexpensive construction, for the advent of the radio has created a universal demand for devices of the character mentioned. Numerous types of chargers have heretofore been proposed, but these have not proven entirely satisfactory due to their complex construction, lack of portability, and high cost of manufacture.

One object of the present invention is to simplify and improve the construction of devices of the type mentioned.

Another object is to provide an inexpensive, efficient and portable battery charger.

Other objects and advantages will appear from the following description of an illustrated embodiment of the present invention.

In the drawings:

Figure 1 is a sectional view of a charger embodying features of the present invention.

Figure 2 is a view in elevation of the charger shown in Figure 1.

Figure 3 is a plan view of the device shown in Figure 2.

Figure 4 is a conventional circuit diagram showing a charging circuit.

The device selected for illustration comprises a base, in this instance a transformer housing 10, constituting a cup shaped member stamped from sheet material which has mounted therein a transformer 11 of standard construction. The transformer 11 is insulated from the housing by means of sealing paraffin 12 or other suitable material which is poured therein to maintain the transformer in spaced relation to the housing walls. A closure 13 is secured to the open end of the housing 10 in any appropriate manner to sustain the transformer with the sealing means 12 associated therewith.

As shown, the upper face of the housing 10 is depressed to provide a peripheral edge 14 to support and seat a fluid container 15 preferably of glass which, in the present embodiment consists of an ordinary Mason jar, having a threaded mouth 16 of standard construction. The mouth of the container 15 is provided with a closure 17 composed of any suitable insulating material which is preferably non-hygroscopic. The closure 17 has a recessed portion 18 threaded to correspond with the mouth of the container 16 whereby the former may be removably secured to the latter in an obvious and well known manner. A lead electrode 19 is suspended within the container 15 from the closure 17 by means of a suitable terminal 20. Another electrode 21 preferably composed of tantalum is also suspended from the closure 17 in spaced relation to the electrode 19, it also terminating in a terminal 22 projecting through the top of the closure. A depending sleeve 23 of non-conducting and acid resisting material is supported in any appropriate manner from the cap 17 to encase the electrode 21, the latter terminating at a point below the extremity of the sleeve. Any suitable electrolyte 26 such as sulphuric acid, is provided in the container 15 so that the depending electrodes 19 and 21 will be immersed therein.

A bail 24, in this instance bent from wire to define a U-shaped member terminating in curved hooks 25, is pivotally associated with the housing 10 so as to selectively clamp the container 15 to the housing 10, thereby maintaining the parts together in a self-contained unit. The bail 24 has a depressed portion 27 intermediate the ends thereof to yieldingly engage an arcuate lug 28 formed integral with the closure 17 to make possible a convenient disengagement of the clamp from the closure to permit dismantling of the unit.

A pair of electrical conductors 29 and 30 project through the housing 10 and are properly insulated therefrom by means of the plug 31, the conductors bing connected to the terminals 32 of the primary coil of the transformer. The secondary of the transformer 11 terminates in a pair of terminals 33 which project from and are secured to the wall of the housing 10 in any appropriate manner. An electrical connection is established between the electrode 21 and one terminal of the secondary 33 through the wire 34. The electrode 19 (Figure 4) is provided with an electrical conductor 35 adapted to be connected to the negative terminal 36 of the battery to be charged, whereas the positive terminal 37 thereof is connected through a suitable conductor to the other terminal 33 of the secondary of the transformer.

With the above described connections, it will be apparent that the conductors 29 and 30 which are connected to an alternating current source impresses pulsations designated by arrows "A" and "B" in the rectifying circuit, the former being opposed by the counter electromotive force generated by the electrodes 19 and 21, thereby entirely counteracting the current "A" in the rectifying circuit and only permitting the pulsations or current flow "B" to flow in the direction shown. Obviously, the current passing through the battery to be charged will flow in one direction, only as indicated by the arrow "B" thereby charging the same. It is to be noted that the above arrangement of parts provides a very portable, compact, and inexpensive device for the purpose specified.

I am aware that many changes may be made and numerous details of the construction varied through a wide range without departing from the principles of this invention and I therefore do not purpose limiting the patent granted hereon, otherwise than necessitated by the prior art.

I claim as my invention:

1. In a self-contained device, a base, a fluid container associated with said base, rectifying means suspended within said container, and a bail pivotally associated with said base to maintain said container on said base.

2. In a self contained device, a base, a transformer fixed in said base, a fluid container having a threaded mouth, mounted on said base, a threaded cap engaging the mouth of said container, current rectifying means suspended from said cap in said container, a clamp bent from wire pivotally secured to said base to engage said cap, whereby said container is removably associated with said base.

3. In a self-contained device, a transformer housing, a fluid container separably associated with said housing, clamping means for said fluid container pivotally associated with said housing, and current rectifying means in said container.

4. In a self-contained device, a transformer housing, a transformer in said housing, a fluid container removably associated with said housing, a closure for said container, rectifying means in said container suspended from said closure, and a bail passing around said closure and pivotally connected to said housing.

In testimony whereof I have hereunto subscribed my name.

CHESTER M. ANGELL.